(12) United States Patent
Yamazaki et al.

(10) Patent No.: US 10,889,098 B2
(45) Date of Patent: Jan. 12, 2021

(54) METHOD, DATA PROCESSING DEVICE, AND MACHINE TOOL FOR GENERATING DIMENSIONAL TOOL PATHS AND CONTROL SIGNALS FOR MATERIAL DISPOSITIONING

(71) Applicants: MACHINE TOOL TECHNOLOGIES RESEARCH FOUNDATION, San Francisco, CA (US); DMG MORI CO., LTD., Yamatokoriyama (JP)

(72) Inventors: Kazuo Yamazaki, San Francisco, CA (US); David Carter, San Francisco, CA (US); Makoto Fujishima, Yamatokoriyama (JP); Yohei Oda, Yamatokoriyama (JP)

(73) Assignees: MACHINE TOOL TECHNOLOGIES RESEARCH FOUNDATION, San Francisco, CA (US); DMG MORI CO., LTD., Yamatokoriyama (JP)

( * ) Notice: Subject to any disclaimer, the term of this patent is extended or adjusted under 35 U.S.C. 154(b) by 294 days.

(21) Appl. No.: 15/484,382

(22) Filed: Apr. 11, 2017

(65) Prior Publication Data
US 2017/0297323 A1 Oct. 19, 2017

(30) Foreign Application Priority Data

Apr. 15, 2016 (JP) ................................. 2016-082304
Jun. 28, 2016 (JP) ................................. 2016-127833

(51) Int. Cl.
*G05B 19/40* (2006.01)
*B33Y 50/02* (2015.01)
(Continued)

(52) U.S. Cl.
CPC ............ *B33Y 10/00* (2014.12); *B29C 64/106* (2017.08); *B29C 64/153* (2017.08);
(Continued)

(58) Field of Classification Search
CPC .... B23K 26/34; B23K 26/1476; B23K 26/32; B23K 26/144; B29C 64/153
See application file for complete search history.

(56) References Cited

U.S. PATENT DOCUMENTS

| 4,724,299 A | * | 2/1988 | Hammeke | B05B 7/1486 |
| | | | | 219/121.6 |
| 5,837,960 A | * | 11/1998 | Lewis | B23K 26/34 |
| | | | | 219/121.63 |

(Continued)

FOREIGN PATENT DOCUMENTS

| JP | 2003-5811 | 1/2003 |
| JP | 2015-199197 | 11/2015 |

OTHER PUBLICATIONS

Allwooda et al., "Manufacturing at double the speed", Jul. 22, 2015, Journal of Materials Processing Technology 229 (2016) 729-757. (Year: 2015).*

(Continued)

*Primary Examiner* — Mohammad Ali
*Assistant Examiner* — Kelvin Booker
(74) *Attorney, Agent, or Firm* — Oblon, McClelland, Maier & Neustadt, L.L.P.

(57) ABSTRACT

A method for generating control data is a method for generating control data for manufacturing a product having a designated shape using an additive manufacturing technology. The control data includes a path of a nozzle for supplying a material. The method for generating the control data includes: determining a cutting path for cutting the designated shape by a tool; and determining the path of the nozzle by reproducing the cutting path temporally reversely.

10 Claims, 8 Drawing Sheets

(51) Int. Cl.
B29C 64/188 (2017.01)
B33Y 10/00 (2015.01)
B33Y 40/00 (2020.01)
B33Y 50/00 (2015.01)
B29C 64/153 (2017.01)
B29C 64/106 (2017.01)
B29C 64/386 (2017.01)
B33Y 30/00 (2015.01)
G05B 19/4099 (2006.01)

(52) U.S. Cl.
CPC .......... *B29C 64/188* (2017.08); *B29C 64/386* (2017.08); *B33Y 30/00* (2014.12); *B33Y 40/00* (2014.12); *B33Y 50/00* (2014.12); *B33Y 50/02* (2014.12); *G05B 19/4099* (2013.01); *G05B 2219/49023* (2013.01)

(56) References Cited

U.S. PATENT DOCUMENTS

| | | | | |
|---|---|---|---|---|
| 6,355,086 | B2* | 3/2002 | Brown | B22F 3/1055 428/539.5 |
| 6,769,969 | B1* | 8/2004 | Duescher | B24B 1/00 451/287 |
| 6,792,326 | B1* | 9/2004 | Duignan | B23K 26/04 430/11 |
| 6,823,230 | B1* | 11/2004 | Jamalabad | G05B 19/4099 700/119 |
| 6,859,681 | B1* | 2/2005 | Alexander | G05B 19/4099 700/118 |
| 6,940,037 | B1* | 9/2005 | Kovacevic | B23K 9/044 219/121.64 |
| 7,423,236 | B2* | 9/2008 | Suh | B23K 26/032 219/121.64 |
| 9,126,365 | B1* | 9/2015 | Mark | B29C 31/042 |
| 9,126,367 | B1* | 9/2015 | Mark | B29C 70/20 |
| 9,186,846 | B1* | 11/2015 | Mark | B33Y 70/00 |
| 9,221,216 | B2* | 12/2015 | Chen | B29C 64/135 |
| 9,327,452 | B2* | 5/2016 | Mark | B29C 70/20 |
| 9,522,426 | B2* | 12/2016 | Das | B22F 3/1055 |
| 9,950,474 | B2* | 4/2018 | Batchelder | B33Y 10/00 |
| 9,956,725 | B2* | 5/2018 | Mark | B29C 70/20 |
| 10,016,942 | B2* | 7/2018 | Mark | B29C 70/20 |
| 10,048,661 | B2* | 8/2018 | Arthur | G05B 15/02 |
| 10,076,875 | B2* | 9/2018 | Mark | B29C 64/194 |
| 10,076,876 | B2* | 9/2018 | Mark | B29C 64/118 |
| 10,099,427 | B2* | 10/2018 | Mark | B29C 64/106 |
| 10,254,499 | B1* | 4/2019 | Cohen | B23K 26/342 |
| 10,307,957 | B2* | 6/2019 | Vittitow | B22F 3/1055 |
| 10,336,006 | B1* | 7/2019 | Cohen | B33Y 10/00 |
| 10,520,923 | B2* | 12/2019 | Connor | B33Y 50/02 |
| 2002/0129485 | A1* | 9/2002 | Mok | G05B 19/4099 29/527.2 |
| 2014/0291886 | A1* | 10/2014 | Mark | B29C 69/001 264/163 |
| 2014/0328963 | A1* | 11/2014 | Mark | B29C 64/386 425/143 |
| 2014/0328964 | A1* | 11/2014 | Mark | B29C 64/393 425/166 |
| 2014/0361460 | A1* | 12/2014 | Mark | B29C 70/521 264/248 |
| 2015/0108677 | A1* | 4/2015 | Mark | B29C 64/165 264/138 |
| 2015/0283762 | A1 | 10/2015 | Maeda et al. | |
| 2015/0290875 | A1* | 10/2015 | Mark | B29C 64/118 264/138 |
| 2015/0314531 | A1* | 11/2015 | Mark | B29C 64/106 264/241 |
| 2015/0375457 | A1* | 12/2015 | Mark | B29C 67/0088 425/166 |
| 2016/0019270 | A1* | 1/2016 | Jones | G06F 16/248 700/98 |
| 2016/0052208 | A1* | 2/2016 | Debora | B29C 64/118 264/40.1 |
| 2016/0361869 | A1* | 12/2016 | Mark | B29C 70/20 |
| 2017/0232674 | A1* | 8/2017 | Mark | B33Y 30/00 264/308 |
| 2017/0306171 | A1* | 10/2017 | Vidavsky | B33Y 70/00 |
| 2018/0193947 | A1* | 7/2018 | Harding | B23K 26/032 |
| 2018/0230246 | A1* | 8/2018 | Vidavsky | B33Y 70/00 |
| 2019/0010270 | A1* | 1/2019 | Ely | C08F 2/46 |
| 2019/0022725 | A1* | 1/2019 | Bauer | B21C 33/00 |

OTHER PUBLICATIONS

Ding, D., "Process planning for robotic wire ARC additive manufacturing", 2015, Doctor of Philosophy thesis, School of Mechanical, Materials and Mechatronics Engineering, University of Wollongong. (Year: 2015).*

Tapia, G., Elwany, A., "Review on Process Monitoring and Control in Metal-Based Additive Manufacturing", Dec. 2014, Journal of Manufacturing Science and Engineering. (Year: 2014).*

Liu, R., Wang, Z., Zhang, Y., Sparks, T., Liou, F., "A Smooth Toolpath Generation Method for Laser Metal Deposition", 2016, Solid Freeform Fabrication 2016: Proceedings of the 26th Annual International Solid Freeform Fabrication Symposium—An Additive Manufacturing Conference. (Year: 2016).*

Saqib, Syed Mohammad, "Experimental Investigation of Laser Cladding Bead Morphology and Process Parameter Relationship for Additive Manufacturing Process Characterization", 2016, Electronic Theses and Dissertations. 5782. (Year: 2016).*

Flynn, J.M., Shokrani, A., Newman, S.T., Dhokia, V., "Hybrid additive and subtractive machine tools—Research and industrial developments", Jun. 12, 2015, International Journal of Machine Tools & Manufacture 101 (2016) 79-101. (Year: 2015).*

Hossain, M.M.; Vuduc, R.W.; Chandra Nath, C.; Kurfess, T.R.; Tucker, T.M., "A Graphical Approach for Freeform Surface Offsetting With GPU Acceleration for Subtractive 3D Printing", Jun. 27-Jul. 1, 2016, Proceedings of the ASME 2016 International Manufacturing Science and Engineering Conference. (Year: 2016).*

Lee, W.-C.; Wei, C.-C.; Chung, S.-C., "Development of a hybrid rapid prototyping system using low-cost fused deposition modeling and five-axis machining", Dec. 10, 2013, Journal of Materials Processing Technology 214 (2014) 2366-2374. (Year: 2013).*

Joseph J. Beaman, J.J.; Atwood, C.; Bergman, T.L.; Bourell, D., Additive/Subtractive Manufacturing Research and Development in Europe, Dec. 2014. (Year: 2014).*

S. Palanivel, P. Nelaturu, B. Glass, R.S. Mishra, "Friction stir additive manufacturing for high structural performance through microstructural control in an Mg based WE43 alloy", Jun. 2014, Materials and Design 65 (2015) 934-952. (Year: 2014).*

X. Wang, X. Gong and K. Chou, "Review on powder-bed laser additive manufacturing of Inconel 718 parts", Mar. 2015, Proc IMechE Part B: J Engineering Manufacture 2017, vol. 231(11) 1890-1903. (Year: 2015).*

* cited by examiner

METHOD, DATA PROCESSING DEVICE, AND MACHINE TOOL FOR GENERATING DIMENSIONAL TOOL PATHS AND CONTROL SIGNALS FOR MATERIAL DISPOSITIONING

BACKGROUND OF THE INVENTION

Field of the Invention

The present invention relates to a method for generating control data in an additive manufacturing technology.

Description of the Background Art

Conventionally, an additive manufacturing technology has been known. The additive manufacturing technology refers to a process of producing an object by adding a material based on a numeric representation of a three-dimensional shape. In many cases, the additive manufacturing technology is implemented by stacking layers on one another, and is in contrast to a subtractive manufacturing technology. It should be noted that the definition of such an additive manufacturing technology is provided in ASTM F2792-12a (Standard Terminology for Additive Manufacturing Technologies) of ASTM International, which is a private, standards development organization for industrial standards. In addition, the additive manufacturing technology is also referred to as "3D printer".

Japanese Patent Laying-Open No. 2015-199197 discloses a method for generating a tool path in a stacked layer creating step in a powder bed method.

Moreover, as shown in Japanese Patent Laying-Open No. 2003-005811, computer aided manufacturing (CAM) has been also known. The CAM, which is used to manufacture a product, is software for creating an NC program for machining or the like based on shape data created by CAD (computer aided design) as input data.

SUMMARY OF THE INVENTION

The technology of Japanese Patent Laying-Open No. 2015-199197 is directed to the powder bed method. This method is suitable for a method for stacking thin films one by one. On the other hand, a shape can be more freely created by a method for cladding on a surface of a material by emitting laser while applying powders from a nozzle. However, it is more difficult to determine an appropriate tool path of the nozzle, which is three-dimensionally movable, as compared with a case of performing solidification for each layer (only in consideration of motion in a plane).

The invention of the present application has been made in view of the above problem, and has an object to provide: a method for generating control data (typically, a path of a nozzle), with which a shape desired by a user can be generated, in an additive manufacturing technology; an data processing device configured to generate the control data; a machine tool capable of implementing the additive manufacturing technology; and a program for generating the control data.

According to an aspect of the present invention, a method for generating control data is a method for generating control data for manufacturing a product having a designated shape using an additive manufacturing technology. The control data includes a path of a nozzle for supplying a material. The method for generating the control data includes: determining a cutting path for cutting the designated shape by a tool; and determining the path of the nozzle by reproducing the cutting path temporally reversely.

According to another aspect of the present invention, an data processing device generates control data for manufacturing a product having a designated shape using an additive manufacturing technology. The control data includes a path of a nozzle for supplying a material. The data processing device includes: a first determination unit configured to determine a cutting path for cutting the designated shape by a tool; and a second determination unit configured to determine the path of the nozzle by reproducing the cutting path temporally reversely.

According to still another aspect of the present invention, a machine tool is capable of implementing an additive manufacturing technology. The machine tool includes a control unit configured to generate control data for manufacturing a product having a designated shape using the additive manufacturing technology. The control data includes a path of a nozzle for supplying a material. The control unit includes a first determination unit configured to determine a cutting path for cutting the designated shape by a tool. The machine tool further includes a second determination unit configured to determine the path of the nozzle by reproducing the cutting path temporally reversely.

According to yet another aspect of the present invention, a program is used to generate control data for manufacturing a product having a designated shape using an additive manufacturing technology. The control data includes a path of a nozzle for supplying a material. The program causes a processor of an data processing device having the program stored therein to: determine a cutting path for cutting the designated shape by a tool; and determine the path of the nozzle by reproducing the cutting path temporally reversely.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
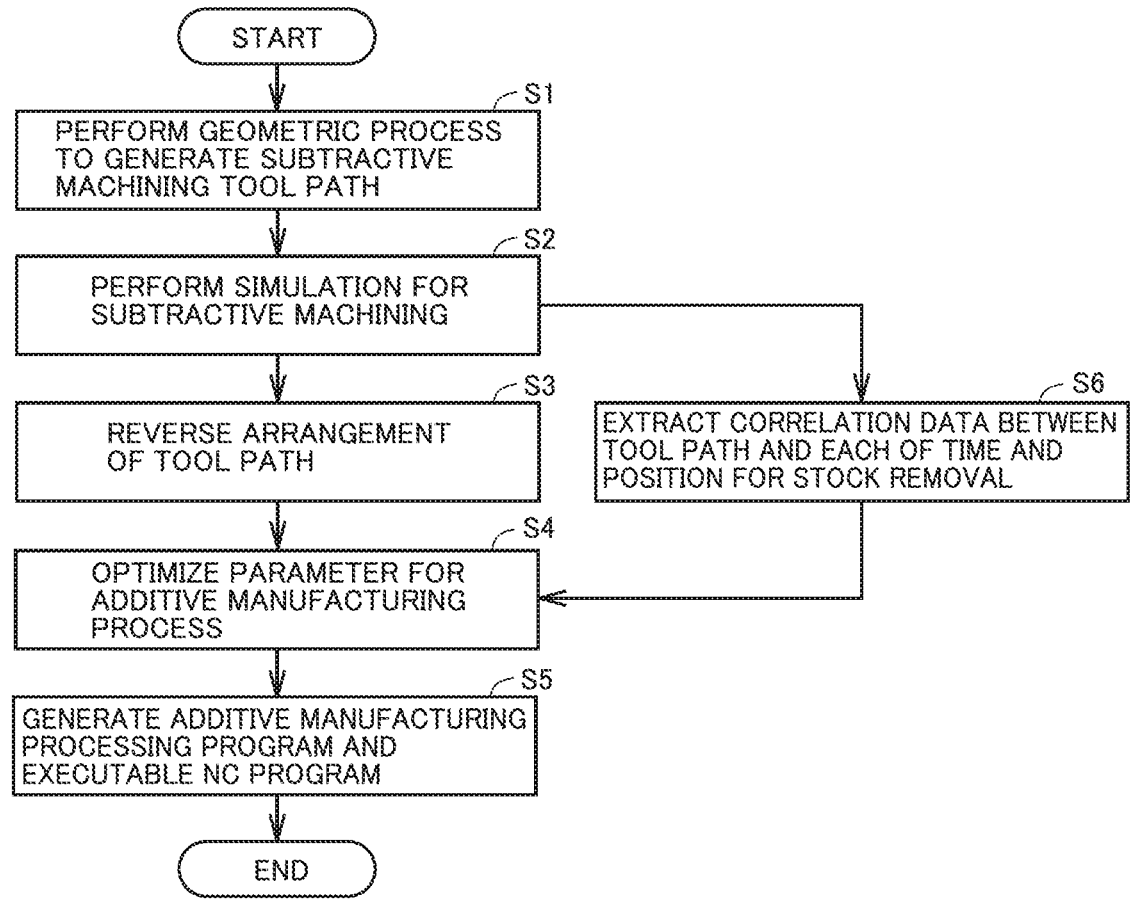
FIG. 1 is a flowchart for illustrating a method for forming a tool path of a nozzle.

In the description below, it is assumed that a directed energy deposition method is used as an exemplary additive manufacturing process in the additive manufacturing technology. It should be noted that control data described below is used during additive manufacturing. Specifically, the control data is data for manufacturing a product having a designated shape using the additive manufacturing technology.

<A. Introduction>

In the directed energy deposition method, a direction in which material powders (powders) are applied preferably corresponds to the gravity direction as much as possible. A path (hereinafter, also referred to as "tool path Pn") of a nozzle for applying the powders is obtained by selecting a shape that can be perpendicular to the gravity direction. Tool path Pn (motion path; machining path) can be determined from the shape of a final product to be manufactured, as described below. Conventionally, an optimum value is determined through trial and error.

As one of methods of deterministically determining control data such as tool path Pn, the present application provides a unique method, in which such a process of trial and error is omitted.

<B. Principle of Process>

The material powders (metal powders) and a substrate are melted by laser. Thus, the metal powders are sprayed onto and fused with the substrate, thereby expanding a volume. The powders may be provided in a stacked manner in the gravity direction (constraint condition).

The material powders are not melted when not heated to a temperature of not less than the melting point of the material. In order to avoid the substrate from being heated too much, the material powders are cooled and solidified as soon as possible. That is, the material powders need to be heated and then need to be cooled immediately. The powders (in a liquid form) from the nozzle are added to and fused with the substrate, and are cooled simultaneously by the following two effects: dissipation of heat from the melted point as radiation heat; and dissipation of heat from a surface of the material due to a decreased temperature of the melted point caused by heat conduction resulting from a temperature difference in the material. As a result, the powders are solidified.

Specifically, the laser beam, the metal powders, gas for carrier, and gas for shield are applied from the tip of the nozzle for applying the powders while moving the nozzle in a predetermined direction. Accordingly, a melted point is formed on a surface of a workpiece, with the result that the metal powders are welded thereto.

<C. Parameters in Process>

It is said that there are about 19 parameters associated with a process of creating an object through the additive manufacturing technology. Representative examples of the parameters include: a feed rate of the nozzle for applying the powders; scanning of the laser for melting the powders (scanning for increasing an area to be melted); an amount of supply of powders per unit time; an output of the laser per unit time; and the like.

By inputting specific numerical values into such parameters and operating a control program in an additive manufacturing apparatus, one process in the additive manufacturing technology is attained. However, this does not ensure that a desired resultant object is obtained. However, combinations of the parameters are definite. By repeating trial and error, a result close to the desired result can be obtained by way of the process. It should be noted that there are various elements for criteria in determining whether or not the process is succeeded or failed, such as strength of the product (resultant object), denseness of a metal structure of the product, and the like.

Through the process above, an object with a shape (also referred to "semi-final product with a near net shape") close to that of the final product is obtained. In order to improve surface roughness and dimensional accuracy of the semi-final product, cutting and grinding by conventional methods may be required in some cases.

Moreover, some objects to be manufactured by the additive manufacturing technology do not have constant shapes. Depending on a shape, parameters may be changed dynamically by adjusting a laser output (energy) or the like (also referred to as "dynamically additive control").

<D. Requirements>

A powder supplying apparatus is mounted on a conventionally known machine tool (such as a 5-axis machine tool) and is moved in synchronization with motion of the nozzle and supply of the powders. In the machine tool according to the present embodiment, it is possible to control all of the following parameters on time basis by a computer: a speed of the nozzle to be moved in a space; an amount of powders to be applied from the nozzle; and an output of the laser to be emitted to melt the powders.

Before determining the output (intensity) of the laser, the amount of supply of powders, and the like, it is necessary to determine tool path Pn (path of the nozzle) (first requirement). It is very important in an initial stage to form tool path Pn in which the nozzle is moved to achieve formation of the contour of a three-dimensional shape. After determining tool path Pn, the amount of supply of powders and the output of the laser are determined. If the amount of supply of powders is large, it is necessary to increase the laser intensity in order to avoid insufficient melting and solidification of the powders. If the amount of supply of powders is small and the laser intensity is high, the powders are evaporated. Hence, it is necessary to decrease the laser intensity.

Thus, based on generated tool path Pn, the amount of supply of powders and the output of the laser are determined to be in synchronization with each other (parameter optimization method (second requirement)).

Some powders are not added to the substrate unless heated at a very high temperature. On the other hand, too a high temperature may lead to formation of large metal crystal particles when the melted powders are solidified. This may cause a problem in strength of the product. Therefore, in order to add the powders appropriately onto the substrate and increase the strength of the product, it is necessary to optimize the temperature (specifically, the laser output) when adding the powders. Further, since a rate of cooling the substrate having the powders added thereon also has an influence over the strength of the product, it is also necessary to optimize the cooling rate (third requirement). Specifically, in order for a final product to satisfy a predetermined quality, control needs to be performed in consideration of a heat transfer phenomenon under the condition determined in the second requirement (evolved step).

<E. Approaches>

(1) First Approach

Tool path Pn (path of the nozzle) is generated based on a geometric process.

(2) Second Approach

Deposition of the material (metal) due to the motion of the nozzle is controlled. A process is performed in association with the motion of the machine, the shape (arrangement), and the deposition of the material. It should be noted that complicated dynamics of heat and mass transfer may be ignored.

(3) Third Approach

An improved system model for improving the process control is added. In order to construct a more complete system control model, a heat and mass transfer phenomenon model is introduced.

By adding the third approach to the first approach and the second approach, a more excellent (more complete) technology is achieved.

<F. Method>

(1) Determined first are: a manner of moving the nozzle; and an amount of powders to be supplied in synchronization with the motion of the nozzle.

Machining in a general machine tool is subtractive machining, which is in contrast to the additive manufacturing. Typically, the subtractive machining is metal cutting. In the subtractive machining, for example, in order to form a cylindrical shape from a stock (starting material constituted of a metal or alloy block), unnecessary portions are cut into chips using a tool.

On the other hand, in the additive manufacturing technology, a shape is created by spraying powders onto a substrate while moving a nozzle in a manner corresponding to the cylindrical shape.

In the case of the additive manufacturing, based on a product to be actually manufactured (product desired by the user), it is necessary to determine: a position to be first supplied with the powders in the space; a manner of moving the nozzle; and an amount of powders to be supplied thereto.

(2) FIG. 1 is a flowchart for illustrating a method for forming tool path Pn (path of the nozzle). With reference to FIG. 1, in a step S1, a machine tool (typically, a numerical value control apparatus) performs a geometric process to generate a subtractive machining tool path. In a step S2, the machine tool performs a simulation for the subtractive machining.

In a step S3, the machine tool reverses the arrangement of the tool path (calculates a path reverse thereto). In a step S4, the machine tool optimizes a parameter for the additive manufacturing process (additive shaping). In a step S5, the machine tool generates an additive manufacturing processing program and an executable NC (Numerical Control) program.

Moreover, during a period of time from step S2 to step S4, the machine tool extracts correlation data between the tool path and each of time and position for removal of the stock as shown in a step S6. Thus, the data to be actually used in the control parameters of the additive manufacturing process is obtained from the subtractive machining simulation.

Figure 2:
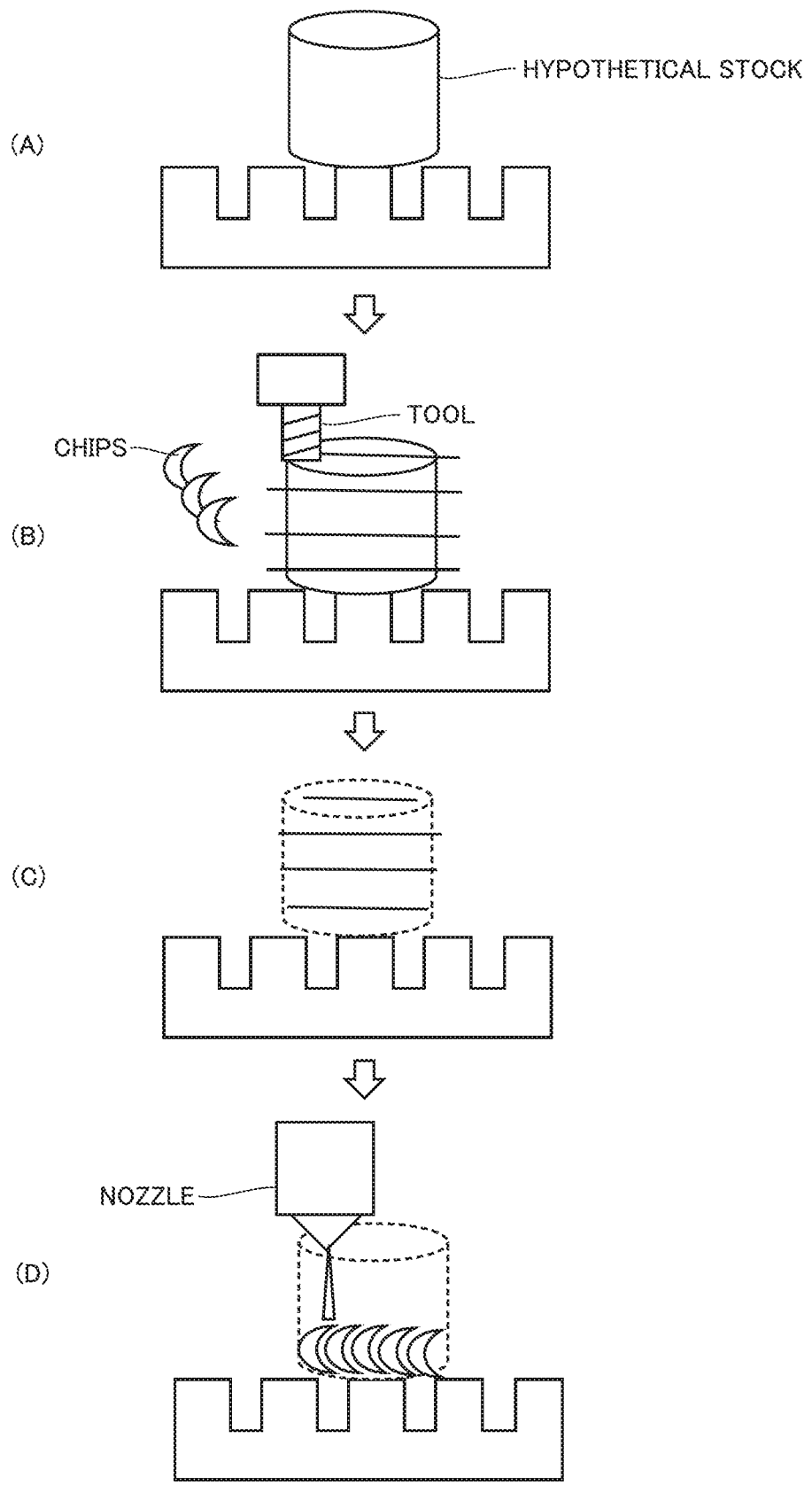
FIG. 2 illustrates a flow of a process performed in a machine tool.

(3) FIG. 2 illustrates a flow of a process performed in the machine tool according to the present embodiment. Moreover, FIG. 2 also illustrates the subtractive machining simulation shown in step S2 of FIG. 1. The following describes a case of generating a semi-final product having a columnar shape using the additive manufacturing technology.

First, the user generates shape data indicating a columnar shape through CAD (computer aided design). The shape data is then used as input data for CAM (computer aided manufacturing). Accordingly, a simulation for cutting the columnar shape can be performed. It should be noted that the CAM may be installed in the numerical value control apparatus of the machine tool or may be installed in an data processing device 800 (see FIG. 3) that can communicate with the machine tool.

With reference to FIG. 2, as shown in states (A) to (C), a hypothetical stock is set. This hypothetical stock is cut by a tool (end mill) along a determined cutting path until the hypothetical stock is finally formed into only chips. It should be noted that since these processes are performed by generally available CAM (software capable of a three-dimensional simulation of metal cutting), actual machining is not performed.

In the simulation, the semi-final product having the columnar shape is entirely formed into chips. Hence, this simulation is a step unnecessary in producing a final product by cutting. However, this simulation is significant in the additive manufacturing technology. This will be explained as follows.

Every course of the simulation is fully recorded in a memory of the computer (numerical value control apparatus). An amount of generated chips (i.e., an amount of removed metal) due to motion and change in posture of the tool is recorded in the memory together with the motion path of the tool.

Since the computer stores information until the stock is entirely cut, the computer temporally reversely reproduces these pieces of information. By arranging the fully recorded data temporally reversely in this way, a relation between the nozzle path and the amount of removal is known. Finally, the shape is returned to the initial shape.

By reversely reproducing the course of completely cutting the stock (state (D)), the shape is returned to the initial shape. In the case of the additive manufacturing, this corresponds to "finally obtaining a desired shape as a result of applying, in a space, an amount of powders corresponding to the amount of removal".

The amount of removal as chips is obtained through the simulation. The amount of removal as chips can be determined by determining an amount (volume) of an overlapped range between the tool and the stock.

Tool path Pn is generated using the CAM. Normally, an optimal path is set automatically in accordance with a shape.

Feed rate and diameter (thickness) of the tool are important elements. The amount of removal is determined based on the overlapped range between the tool and the stock as calculated from these pieces of information. The amount of removal is changed with passage of time. The amount of removal is changed depending on "cutting conditions". Moreover, in the CAM, when the amount of cutting (unit time) is set, the feed rate and the like are determined automatically. In the present embodiment, the amount of supply of powders is determined based on the amount of removal as chips.

<G. Material Deposition Control>

(1) In the present embodiment, as three important parameters among the 19 parameters described above, it is necessary to determine the motion speed of the nozzle, the output (power) of the laser, and the amount of supply of powders.

The amount of chips due to the motion of the tool (i.e., the amount of removal) is determined. This amount has a correlation with the amount of supply of powders associated with the motion of the nozzle. The laser output necessary to melt the powders can be calculated based on the amount of chips.

In the case of cutting, when the shape of the motion path is complicated or is not a straight shape, the amount of generated chips is remarkably changed depending on the motion of the tool. On the other hand, in the case of the additive manufacturing, it is difficult to momentarily change the amount of supply of powders.

Therefore, in the additive manufacturing, a high-quality product is more likely to be manufactured by changing the motion speed of the nozzle to supply a constant amount of powders. In other words, in order to increase an amount of deposition of powders per unit area, the motion speed of the nozzle is decreased, whereas in order to decrease the amount of deposition, the motion speed of the nozzle is increased. As another solution, when cutting information is generated by the CAM, the motion speed and path of the tool may be generated to generate a constant amount of chips.

(2) A position to be supplied with the powders and an amount of the powders to be supplied thereto are controlled with a constant flow being always obtained while controlling the powder flow rate. When these are determined, the output of the laser is determined. It should be noted that the motion speed of the nozzle and the laser power can be changed freely in a short time. On the other hand, it is not easy to change the powder flow rate.

As described above, in the present embodiment, attention is paid to the following point: the volume of the solid material to be added coincides with the volume of the solid material removed in the simulation. That is, the amount of removal as chips is employed as the amount of supply of powders in the additive manufacturing. In the present embodiment, an amount of supply of powders required to be added along tool path Pn in order to obtain a desired amount of deposition is predicted. Further, a laser output required to melt the powders to be deposited is predicted.

<H. Implementation, Etc.>

The above-described process can be implemented by adding a function (program module) to the CAM. That is, the program module is executed on the operating system of the CAM.

Such a program module may be installed in the machine tool including the numerical value control apparatus having the CAM installed therein as described above, or may be installed in a computer in communication with the machine tool or capable of data transfer with the machine tool via an external storage medium.

An advantage of such a configuration is that the conventional CAM program for cutting can be used. In other words, by only adding the function (program module), the CAM for cutting can be modified into CAM for additive manufacturing.

<I. Characteristic Configuration>

(1) In the method for generating the control data (the data processing device, the machine tool, or the program) according to the present embodiment, tool path Pn for the additive manufacturing is generated by generating, using the CAM, a path for cutting a certain shape (for the purpose of removal) and reproducing it reversely. Specifically, data indicating the shape of a product is obtained, and based on the data, a path (cutting path) for hypothetical cutting is automatically or manually generated by the CAM. By reversely reproducing the cutting path, a path for the additive manufacturing is generated in the method for generating the control data.

It should be noted that as described above, tool path Pn (tool path for the additive manufacturing) is generated by preparing the shape by the user using the CAD and processing the CAD data (shape data) using the CAM software.

In the method for generating the control data according to the present embodiment, when tool path Pn is determined, the program module determines the amount of supply of powders, the motion speed of the nozzle, and the output (intensity and power) of the laser. Specifically, in the method for generating tool path Pn, the program module determines the above-described control data (specifically, value of a variable) based on the simulation result of the amount of removal as chips. It should be noted that the direction of the nozzle (the direction in which the powders are applied) is the direction of the gravity (vertically downward direction).

(2) As to Determination of Tool Path Pn

The following configuration may be employed: tool path Pn (path for the additive manufacturing) is not merely reverse (opposite) to the path for cutting in the case of the simulation in the CAM. This is because when the additive manufacturing process is the directed energy deposition method in which powders are sprayed into a space, the powders are more stably sprayed onto a surface of a workpiece by spraying in the gravity direction, for example.

Specifically, in the method for generating tool path Pn according to the present embodiment, tool path Pn (path for the additive manufacturing) is generated such that the tip point (position of an edge) of the tool coincides with the position irradiated with the laser.

<J. External Appearance and Internal Structure of Machine Tool>

Figure 3:
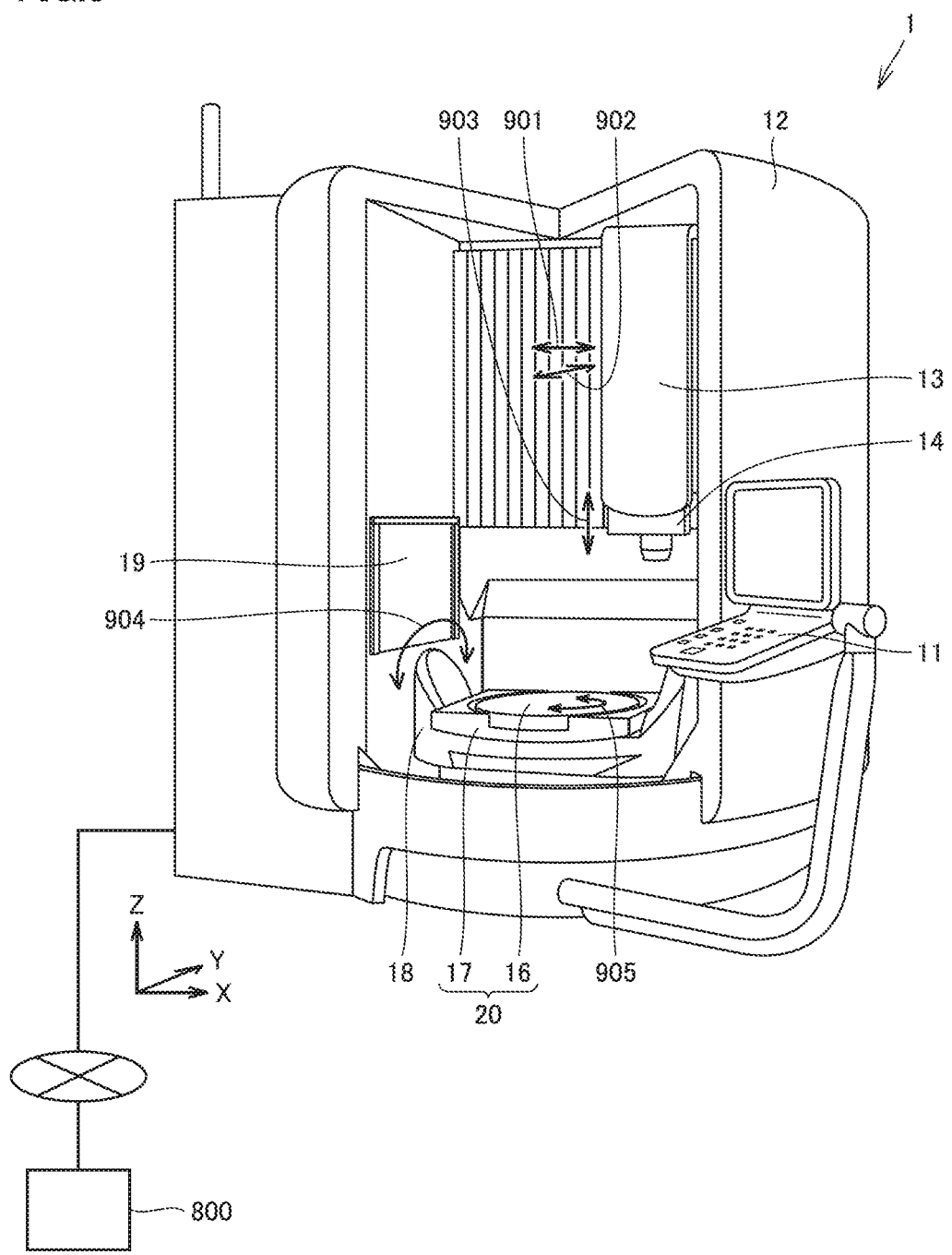
FIG. 3 is a schematic diagram for illustrating external appearance and internal structure of a machine tool for manufacturing a composite member.

FIG. 3 is a schematic diagram for illustrating external appearance and internal structure of a machine tool 1 for manufacturing a composite member. With reference to FIG. 3, machine tool 1 includes an operating system 11, a splash guard 12, a spindle head 13, a spindle 14, a rotation apparatus 18, a door 19, and a table apparatus 20.

Table apparatus 20 has a rotation table 16 and a mount 17 configured to rotatably support rotation table 16. Table apparatus 20 is attached to rotation apparatus 18. Specifically, mount 17 is fixed to the central portion of rotation apparatus 18.

In the present embodiment, operating system 11 not only serves as a conventional control panel (program editing apparatus), but also performs a function as a numerical value control apparatus. It should be noted that machine tool 1 is not limited to such a configuration, and the numerical value control apparatus may not be provided in the housing of the laptop apparatus shown in the figure but may be provided separately in the main body of machine tool 1.

Operating system 11 (specifically, the numerical value control apparatus of operating system 11) controls an overall operation of machine tool 1 by executing a program or the like designed by a user. For example, operating system 11 controls operations of spindle head 13, spindle 14, rotation apparatus 18, door 19, table apparatus 20, and an additive manufacturing apparatus 30 described later. It should be noted that operating system 11 is a well-known system and is therefore not described herein in detail.

Spindle head 13 is attached to a cross rail (not shown). Spindle head 13 is provided to slidably move in an axial direction represented by an arrow 901 (X-axis direction) and an axial direction represented by an arrow 902 (Y-axis direction). Spindle 14 is attached to spindle head 13.

Spindle 14 is provided to slidably move in an axial direction represented by an arrow 903 (Z-axis direction). Spindle 14 has a tip provided with a structure to which a tool holder having a tool attached thereon can be installed.

Examples of the tool holder include: additive manufacturing apparatus 30 (FIG. 4) configured to implement the additive manufacturing technology; and a tool holder stored in a tool magazine (not shown) (for example, a tool holder 40 (FIG. 5) including an end mill). It should be noted that a tool holder other than additive manufacturing apparatus 30 is attached to spindle 14 by an automatic tool changer 21 (FIG. 5).

The tool magazine is disposed opposite to a machining area relative to door 19 (i.e., disposed behind door 19 in FIG. 3). It should be noted that the term "machining area" refers to a space (internal space of machine tool 1) which is partitioned by splash guard 12 and door 19 and in which spindle head 13, spindle 14, rotation apparatus 18, table apparatus 20, additive manufacturing apparatus 30, a workpiece, and the like are movably placed.

Each of spindle head 13 and spindle 14 is appropriately provided with a feed structure, a guidance structure, a servo motor, and the like to enable the slide motion thereof. In machine tool 1, respective slide motions of spindle head 13 and spindle 14 can be combined to freely change the position of the tool attached to the tool holder in the XYZ space.

Rotation apparatus 18 is provided to be rotatable through motor driving with respect to a center axis extending in the X-axis direction. Rotation of rotation apparatus 18 causes table apparatus 20 to rotate clockwisely and counterclockwisely (direction represented by an arrow 904) with respect to the center axis.

In a default state as shown in FIG. 3, rotation table 16 of table apparatus 20 is provided to be rotatable through motor driving with respect to the center axis extending in the vertical (Z-axis) direction. It should be noted that since rotation table 16 is rotated in the direction of arrow 904 by rotation apparatus 18, the center axis of rotation of rotation table 16 is changed while being maintained to be in parallel with the YZ plane.

On rotation table 16, a workpiece is held using a chuck or various types of jigs. During cutting with a stationary tool, rotation table 16 is rotated to cause the workpiece to rotate clockwisely and counterclockwisely (direction of arrow 905) with respect to the center axis.

With the configuration described above, machine tool 1 is capable of changing a posture of a member, such as a workpiece, placed in the machining area.

Figure 4:
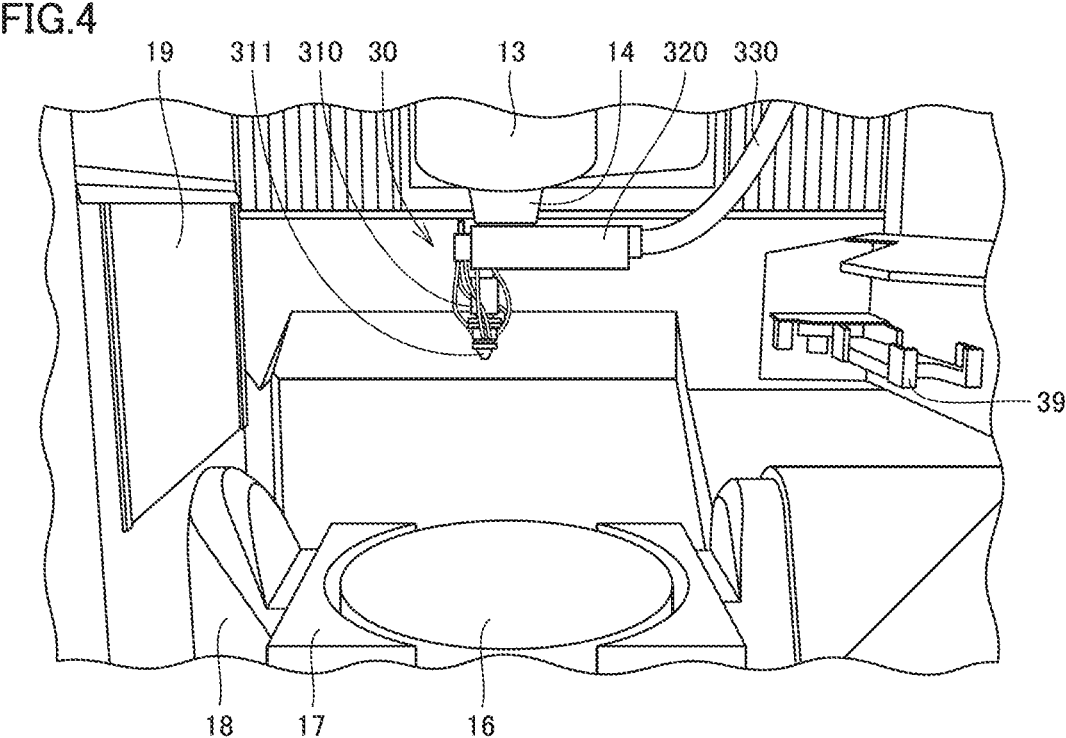
FIG. 4 shows a state in which an additive manufacturing apparatus is attached to a spindle.
Figure 5:
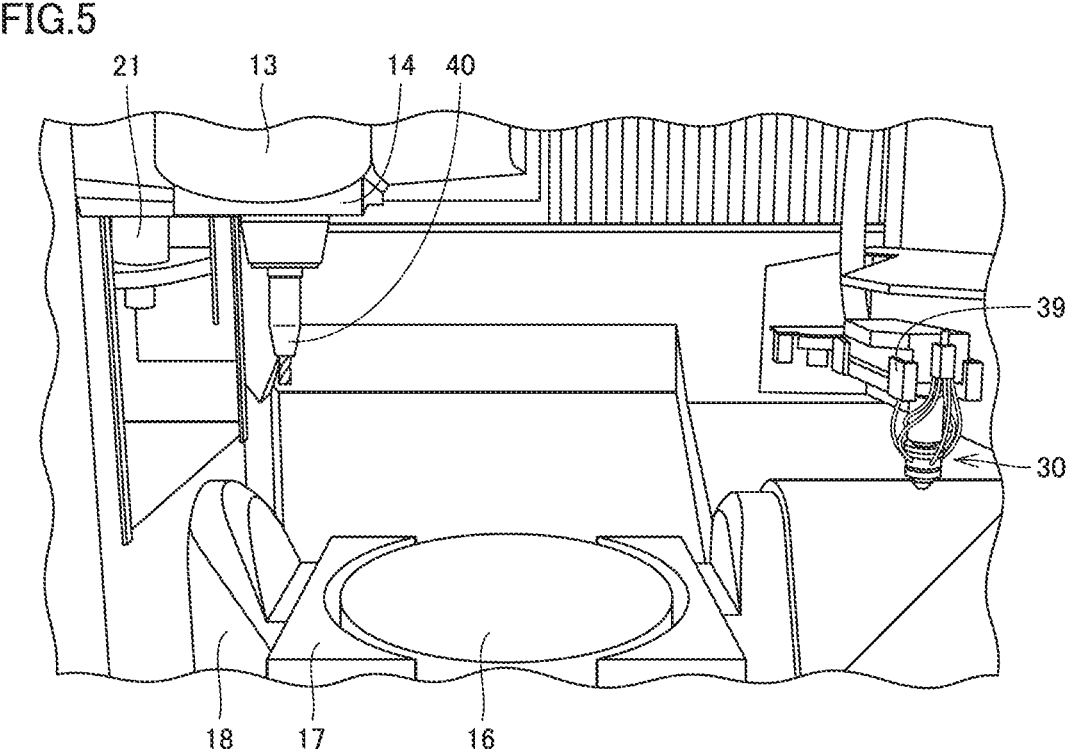
FIG. 5 shows a state in which a tool holder is attached to the spindle.

FIG. 4 shows a state in which additive manufacturing apparatus 30 is attached to spindle 14. With reference to FIG. 4, additive manufacturing apparatus 30 includes an application unit 310, an attachment unit 320, and a hose unit 330.

Although details will be described later, metal powders or the like are applied from tip 311 of application unit 310. Attachment unit 320 is a member for fixing additive manufacturing apparatus 30 to spindle 14. Hose unit 330 is a supply path of the powders or the like. Hose unit 330 is provided to supply the powders or the like from an apparatus (not shown) having the powders or the like stored therein to application unit 310 via attachment unit 320.

When additive manufacturing apparatus 30 is not used, machine tool 1 contains additive manufacturing apparatus 30 in a holder 39 for the additive manufacturing apparatus (see FIG. 5). It should be noted that in order to contain additive manufacturing apparatus 30 therein, holder 39 is configured to be rotatable with respect to a rotation axis while being maintained to be in parallel with the XY plane. That is, holder 39 is rotated with respect to an axis parallel to the Z axis.

FIG. 5 shows a state in which tool holder 40 is attached to spindle 14. With reference to FIG. 5, operating system 11 performs control to open door 19, and then causes the automatic tool changer to attach tool holder 40 to spindle 14. It should be noted that tool holder 40 is exchanged in a state in which additive manufacturing apparatus 30 is stored in holder 39.

<K. Hardware Configuration>

Figure 6:
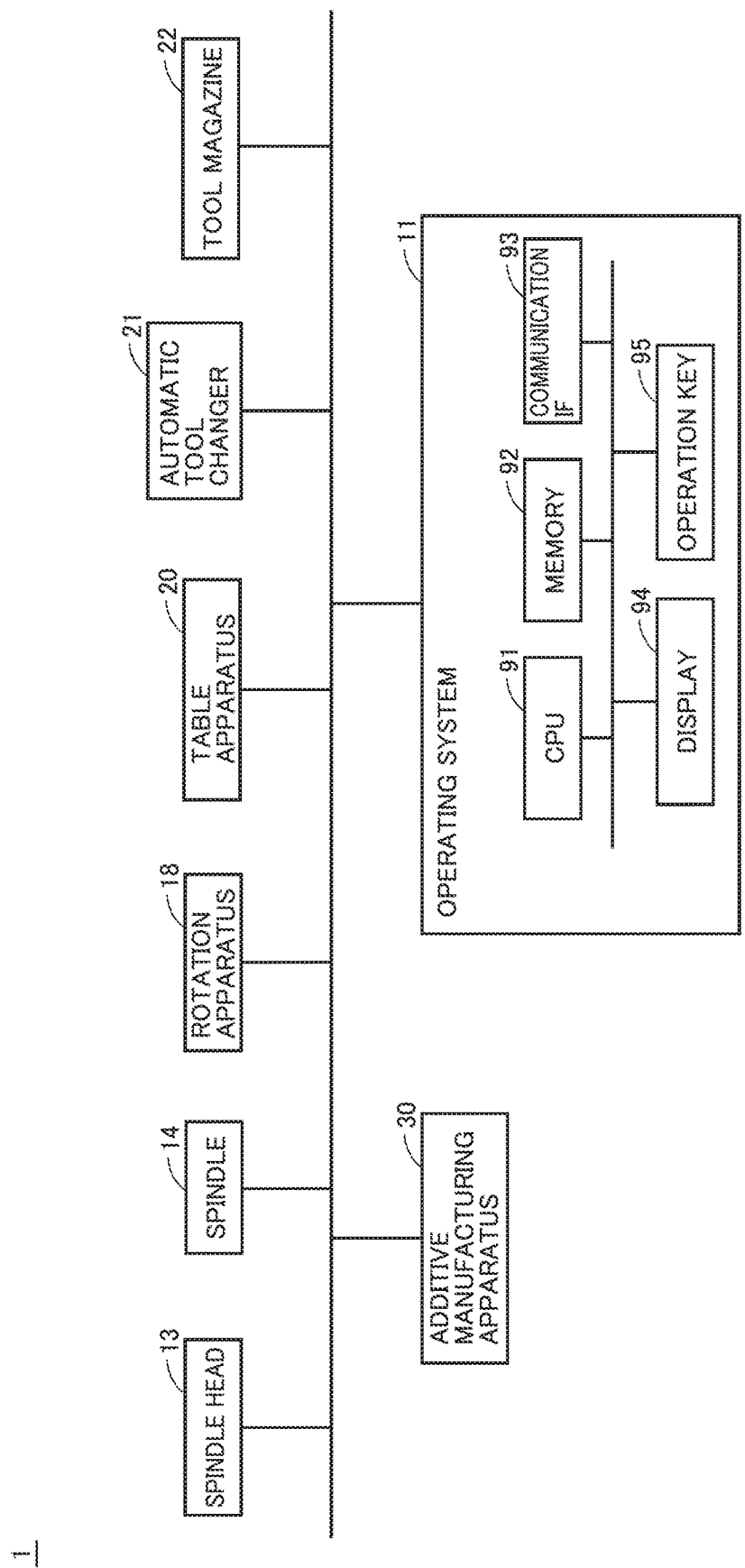
FIG. 6 shows an overview of a hardware configuration of the machine tool.

FIG. 6 shows an overview of a hardware configuration of machine tool 1. With reference to FIG. 6, machine tool 1 includes operating system 11, spindle head 13, spindle 14, rotation apparatus 18, table apparatus 20, automatic tool changer 21, tool magazine 22, and additive manufacturing apparatus 30.

Operating system 11 has a CPU (Central Processing Unit) 91, a memory 92, a communication IF (InterFace) 93, a display 94, and an operation key 95.

CPU 91 executes various types of programs stored in memory 92, thereby controlling respective operations of units of machine tool 1 via communication IF 93. Display 94 displays various types of information in machine tool 1 such that the user of machine tool 1 can visually recognize the information. Operation key 95 receives various inputs (for example, inputs of starting machining) provided by the user.

Specifically, memory 92 of operating system 11 stores: the CAM; and the program module for implementing the additive manufacturing technology employing the above-described reverse reproduction. It should be noted that when operating system 11 performs a process in accordance with an instruction from the user, a semi-final product or a final product is manufactured.

<L. Detailed Example>

The following describes a case where a semi-final product having a cylindrical shape is generated using the additive manufacturing technology. It should be noted that FIG. 7 corresponds to the states (A) to (C) of FIG. 2, and FIG. 8 corresponds to the state (D) of FIG. 2. However, FIGS. 7 and 8, in which the semi-final product having the cylindrical shape is manufactured, are different from FIG. 2 in which the semi-final product having the columnar shape is manufactured.

(1) Simulation of Subtractive Machining

Figure 7:
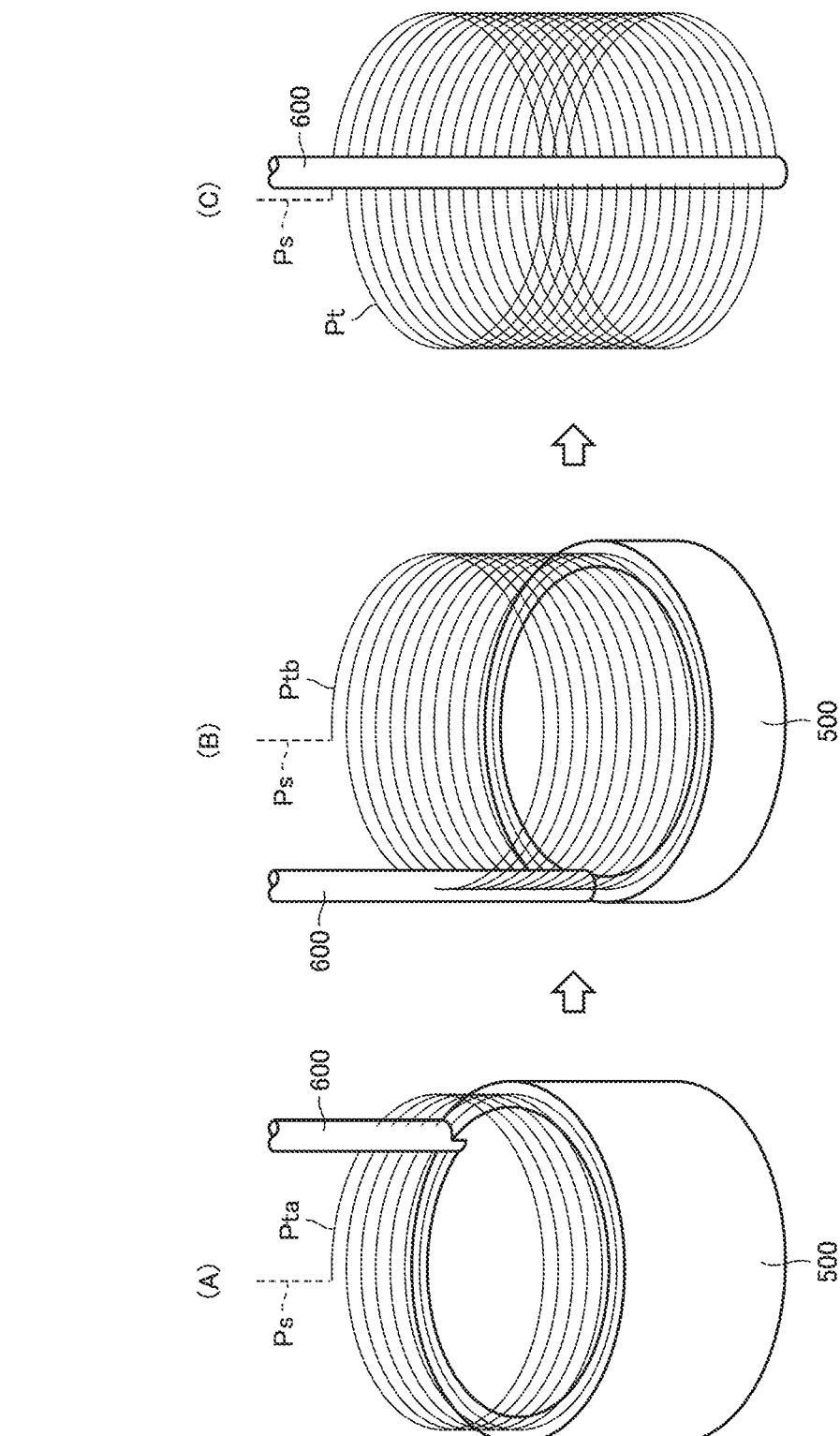
FIG. 7 illustrates a simulation of subtractive machining.

FIG. 7 also illustrates the simulation of the subtractive machining. That is, FIG. 7 illustrates the simulation in the CAM.

With reference to FIG. 7, the state (A) represents a state in which a stock 500 (hypothetical stock) having a cylinder shape is cut by about ⅓ from its upper end in accordance with a cutting condition (including a cutting path) determined in the CAM. A path Ps represents a path of the tip of a hypothetical tool 600 (for example, end mill) until start of the cutting. That is, path Ps represents a path of the tip of tool 600 until the tip comes into contact with the upper end of stock 500. A path Pta represents a part of a cutting path Pt (see the state (C) of FIG. 7). That is, path Pta represents a path in which tool 600 has been already moved, in cutting path Pt determined in the CAM.

The state (B) represents a state in which the cutting proceeds further from the state (A). Specifically, the state (B) represents a state in which stock 500 is cut by about ⅔ from the upper end of stock 500. A path Ptb represents a part of cutting path Pt. That is, path Ptb represents a path in which tool 600 has been already moved, in cutting path Pt.

The state (C) represents a state in which the cutting proceeds further from the state (B). Specifically, the state (C) represents a state in which stock 500 is completely cut. In this way, stock 500 having the cylindrical shape is completely cut by tool 600, with the result that stock 500 ceases to exist.

Operating system 11 of machine tool 1 stores an amount of removal as chips when moving tool 600 along cutting path Pt (amount of removal per unit time), in association with the position of tool 600 (on cutting path Pt), the feed rate of tool 600, and the like. It should be noted that the feed rate of tool 600 can be also determined using the CAM. Moreover, the amount of removal is a value calculated through the simulation in the CAM as described above.

(2) Manufacturing Process of Semi-Final Product by Additive Manufacturing

Operating system 11 generates the control data including tool path Pn by executing the program module for implementing the additive manufacturing technology using the above-described reverse reproduction. Specifically, as described above, operating system 11 determines tool path Pn to be used when generating a designated cylindrical shape (shape identical to that of stock 500) by temporally reversely reproducing cutting path Pt (see the state (C) of FIG. 7). Also, operating system 11 determines values of the control data, such as the amount of supply of powders and the output of the laser.

Figure 8:
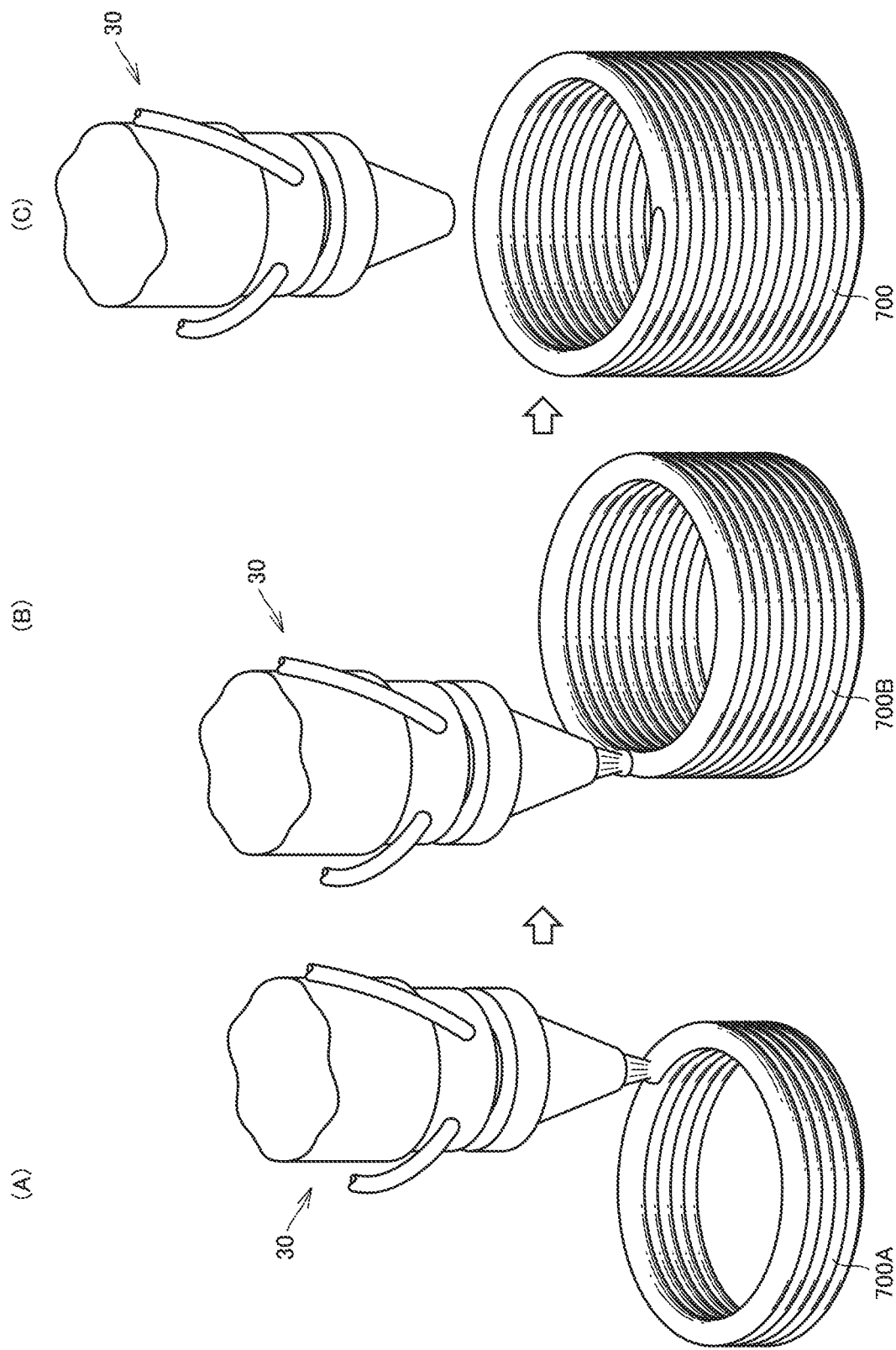
FIG. 8 shows a course of manufacturing of a semi-final product having a cylindrical shape through additive manufacturing by moving the nozzle along the tool path.

FIG. 8 shows a course of manufacturing of a semi-final product 700 having a cylindrical shape through the additive manufacturing by moving the nozzle (specifically, additive manufacturing apparatus 30) along tool path Pn.

The state (A) represents a state in which an intermediate body 700A having a height about ⅓ as high as that of the designated cylindrical shape is generated by moving additive manufacturing apparatus 30 along tool path Pn. The state (B) represents a state in which an intermediate body 700B having a height about ⅔ as high as that of the designated cylindrical shape is generated by moving additive manufacturing apparatus 30 further beyond the state (A) along tool path Pn.

The state (C) represents a state immediately after ending the manufacturing of semi-final product 700 having the cylindrical shape by moving additive manufacturing apparatus 30 further beyond the state (B) along tool path Pn.

As described above, operating system 11 determines tool path Pn, which is the path of the nozzle, by temporally reversing cutting path Pt. Then, operating system 11 moves the nozzle along the determined tool path Pn, whereby the semi-final product having the designated shape is generated by machine tool 1.

<M. Functional Configuration>

Figure 9:
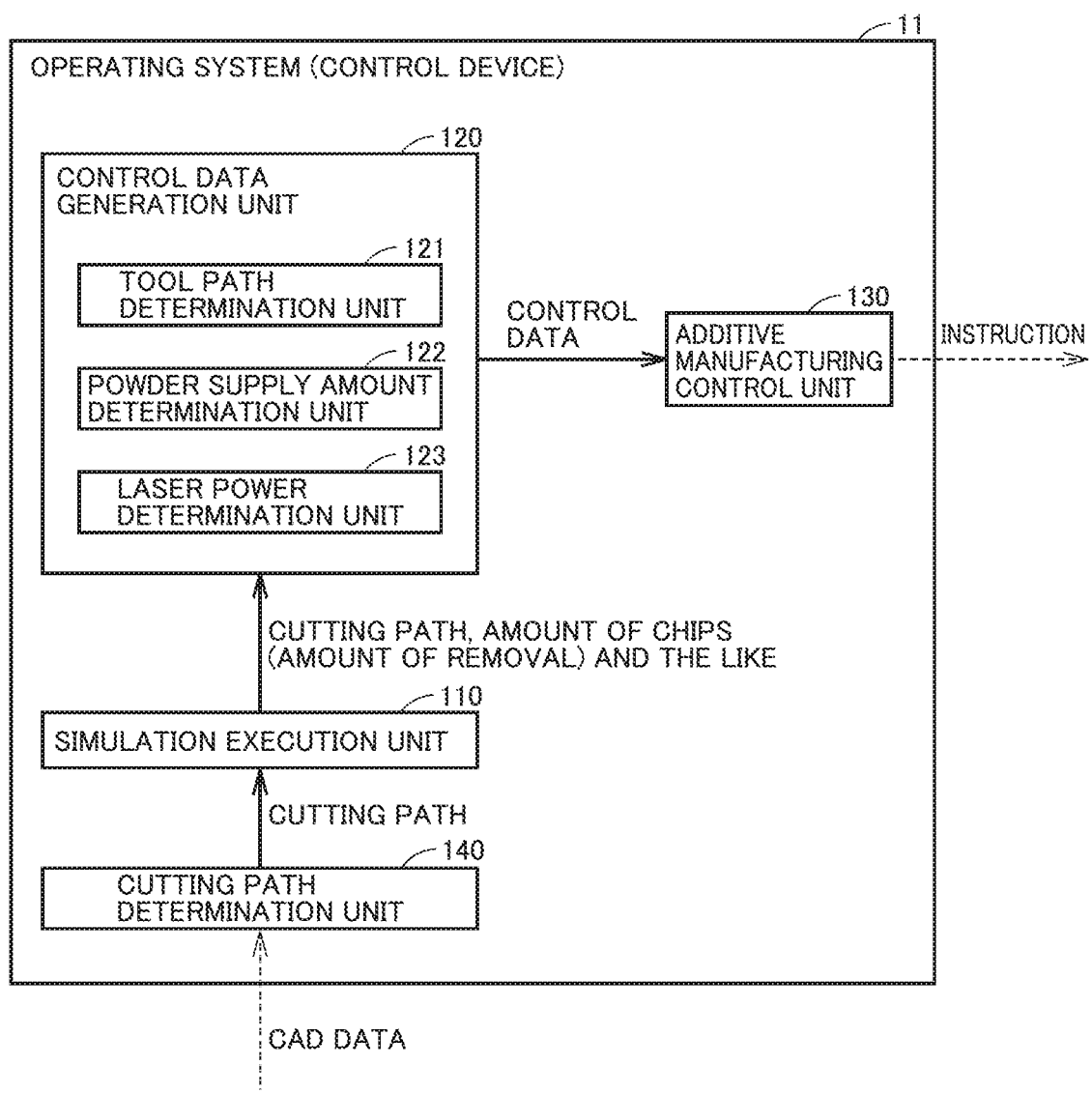
FIG. 9 is a function block diagram for illustrating a functional configuration of an operating system.

FIG. 9 is a function block diagram for illustrating a functional configuration of operating system 11. With reference to FIG. 9, operating system 11 serving as a control device (controller) of machine tool 1 includes: a simulation execution unit 110, a control data generation unit 120, an additive manufacturing control unit 130, and a cutting path determination unit 140.

Control data generation unit 120 has a tool path determination unit 121, a powder supply amount determination unit 122, and a laser power determination unit 123.

Cutting path determination unit 140 determines a cutting path based on CAD data. Cutting path determination unit 140 may determine the cutting path automatically based on the CAD data, or may determine the cutting path based on the user's input (manual operation). Cutting path determination unit 140 may be configured in any manner as long as the cutting path is uniquely determined.

Simulation execution unit 110 performs a simulation of cutting based on the CAD data. Specifically, simulation execution unit 110 performs a simulation of cutting along a set cutting path.

By performing the simulation, information is obtained, such as the cutting path, the amount of removal as chips, and the feed rate of the tool. Simulation execution unit 110 sends these simulation results to control data generation unit 120.

Control data generation unit 120 generates control data for manufacturing, using the additive manufacturing, a product having a shape (designated shape) that is based on the CAD data. Tool path determination unit 121 determines tool path Pn, which is the path of the nozzle (specifically, additive manufacturing apparatus 30) during the additive manufacturing, by temporally reversely reproducing the cutting path.

Powder supply amount determination unit 122 determines the amount of supply of powders. Specifically, powder supply amount determination unit 122 determines the amount of supply of powders at each position on tool path Pn. It should be noted that typically, powder supply amount determination unit 122 sets uniformly the amount of supply at each position on tool path Pn.

Laser power determination unit 123 determines the output of the laser. Specifically, laser power determination unit 123 determines the output of the laser at each position on tool path Pn.

Control data generation unit 120 sends the generated control data to additive manufacturing control unit 130. Based on the control data, additive manufacturing control unit 130 controls the operation of additive manufacturing apparatus 30, the rotation angle of rotation table 16, the rotation angle of rotation apparatus 18, and the like. Accordingly, the semi-final product having substantially the same shape as that indicated in the CAD data is generated. Moreover, the semi-final product is subjected to surface machining using a tool such as polishing in the machining area of machine tool 1, thereby obtaining the final product (product having the same shape as the shape in the CAD data).

It should be noted that the series of processes of control data generation unit 120 are implemented by operating system 11 (specifically, a processor) executing a program incorporated in the CAM. Specifically, the series of processes of control data generation unit 120 are implemented by the processor executing an application program configured to be executable (operable) on the system of the CAM. On the other hand, cutting path determination unit 140 and simulation execution unit 110 are implemented by the processor executing the main part of the CAM (program other than the above-described incorporated application).

<N. Conclusion>

The characteristic configurations in the above-described method for generating the control data are as follows.

(1) The method for generating the control data is a method for generating control data for manufacturing a product having a designated shape using an additive manufacturing technology. The control data includes a path (tool path Pn) of a nozzle for applying a material (powders). The method for generating the control data includes: determining a cutting path for cutting the designated shape by a tool; and determining the path of the nozzle by reproducing the cutting path temporally reversely.

According to the method, it is possible to determine the path of the nozzle by which the shape designated by the user (desired shape) can be generated in the additive manufacturing technology.

(2) The method for generating the control data further includes determining a motion speed of the nozzle, an amount of application of the material, and an output of laser emitted to the material, when implementing the additive manufacturing technology along the path of the nozzle. Accordingly, not only the path of the nozzle but also the motion speed of the nozzle, the amount of application of the material, and the output of the laser emitted to the material are determined.

(3) Determining the cutting path includes calculating an amount of a stock removed from the designated shape by cutting along the cutting path. The motion speed of the nozzle, the amount of application of the material, and the output of the laser are determined based on the amount of the removed stock.

(4) In the step of determining the path of the nozzle, the path of the nozzle is determined such that a position irradiated with the laser coincides with a position of an edge of the tool in the cutting path.

(5) The cutting path is generated using CAM. The path of the nozzle is determined using a program incorporated in the CAM.

<O. Modification>

In the description above, the 5-axis machine having the function of the additive manufacturing technology (i.e., 3D printer) have been described as one example of the above-described machine tool; however, the machine tool is not limited to the 5-axis machine. The machine tool may be any subtractive machine (for example, 4-axis machine) having the function of the additive manufacturing technology.

Moreover, in the description above, the additive manufacturing process (additive shaping) in which the powders are applied has been described as an example; however, the above-described various types of processes can be also applied to an additive manufacturing process in which a wire material is sent out.

<P. Appendix>

(1) In the CAM, the direction of the tool may or may not coincide with the direction of the laser. Since chips fall down in the case of cutting, the direction of the tool may be at any angle; however, it is more suitable that the direction of the tool coincides with the gravity direction when spraying powders.

(2) By determining the amount of removal, tool path Pn is determined. The amount of removal is determined by infeed (the radial direction; the axial direction) and feed rate. The amount of removal is determined by the user. When the amount of removal is determined, tool path Pn, the rotational speed, and the like are determined.

(3) When the powder flow rate is determined, the laser power is determined as a function of energy with which the powders can be melted.

(4) It is very difficult to perform cutting with a constant amount of removal. Normally, even when the motion speed of the tool is made constant, the amount of removal is fluctuated. However, it is difficult to change the amount of supply of powders in the same manner as such a fluctuation. In view of this, the speed of the nozzle and the laser intensity are changed with the amount of supply of powders being constant. This is to deal with the change in amount of removal.

(5) An association between the speed of the nozzle and the laser output becomes different depending on a situation. Hence, control to be performed is programmed in advance. Specifically, a program is prepared which performs control under an optimal condition depending on a situation while holding data indicating a correlation obtained in advance. It should be noted that it is easier to control the speed than the laser output.

(6) In the embodiment above, the directed energy deposition is used as the additive manufacturing process; however, other additive manufacturing processes are applicable such as fused deposition modeling.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A method for generating control data for manufacturing a product having a designated shape using an additive manufacturing technology, the control data including a path of a nozzle for supplying a material, the method for generating the control data comprising:
generating shape data of the designated shape to form a virtual stock corresponding to the product;
determining a cutting path for a virtual cutting of the virtual stock having the designated shape by a tool until the virtual stock is finally formed into only chips;
calculating an amount of the chips removed from the virtual stock by the virtual cutting along the cutting path by determining an amount of an overlapped range between the tool and the virtual stock;
determining the path of the nozzle for implementing the additive manufacturing technology along the path of the nozzle based on the cutting path by temporally reversely reproducing the cutting path; and
determining at least one of a motion speed of the nozzle, an amount of supply of the material, and an output of laser emitted to the material based on the amount of the chips removed from the virtual stock.

2. The method for generating the control data according to claim 1, wherein in determining the path of the nozzle, the path of the nozzle is determined such that a position irradiated with the laser coincides with a position of an edge of the tool in the cutting path.

3. The method for generating the control data according to claim 1, wherein
the cutting path is generated using CAM (Computer Aided Manufacturing), and
the path of the nozzle is determined using a program incorporated in the CAM.

4. The method for generating the control data according to claim 1, wherein the designated shape is columnar.

5. An data processing device for generating control data for manufacturing a product having a designated shape using an additive manufacturing technology, the control data including a path of a nozzle for supplying a material, the data processing device comprising:
a generating unit configured to generate shape data of the designated shape to form a virtual stock corresponding to the product;
a first determination unit configured to determine a cutting path for a virtual cutting of the virtual stock having the designated shape by a tool until the virtual stock is finally formed into only chips;
a calculating unit configured to calculate an amount of the chips removed from the virtual stock by the virtual cutting along the cutting path by determining an amount of an overlapped range between the tool and the virtual stock;
a second determination unit configured to determine the path of the nozzle for implementing the additive manufacturing technology along the path of the nozzle based on the cutting path by temporally reversely reproducing the cutting path; and
a third determination unit configured to determine at least one of a motion speed of the nozzle, an amount of supply of the material, and an output of laser emitted to the material based on the amount of the chips removed from the virtual stock.

6. The data processing device according to claim 5, wherein the second determination unit is configured to determine the path of the nozzle such that a position irradiated with the laser coincides with a position of an edge of the tool in the cutting path.

7. The data processing device according to claim 5, wherein
the data processing device is configured to generate the cutting path using CAM (Computer Aided Manufacturing), and
the second determination unit is configured to determine the path of the nozzle using a program incorporated in the CAM.

8. A machine tool capable of implementing an additive manufacturing technology, the machine tool comprising:
a control unit configured to generate control data for manufacturing a product having a designated shape using the additive manufacturing technology, the control data including a path of a nozzle for supplying a material, the control unit including:
a generating unit configured to generate shape data of the designated shape to form a virtual stock corresponding to the product;
a first determination unit configured to determine a cutting path for a virtual cutting of the virtual stock having the designated shape by a tool until the virtual stock is finally formed into only chips;
a calculating unit configured to calculate an amount of the chips removed from the virtual stock by the virtual cutting along the cutting path by determining an amount of an overlapped range between the tool and the virtual stock;
a second determination unit configured to determine the path of the nozzle for implementing the additive manufacturing technology along the path of the nozzle based on the cutting path by temporally reversely reproducing the cutting path; and
a third determination unit configured to determine at least one of a motion speed of the nozzle, an amount of supply of the material, and an output of laser emitted to the material based on the amount of the chips removed from the virtual stock.

9. The machine tool according to claim 8, wherein the second determination unit is configured to determine the path of the nozzle such that a position irradiated with the laser coincides with a position of an edge of the tool in the cutting path.

10. The machine tool according to claim 8, wherein
the machine tool is configured to generate the cutting path using CAM (Computer Aided Manufacturing), and
the second determination unit is configured to determine the path of the nozzle using a program incorporated in the CAM.

* * * * *